(No Model.) 2 Sheets—Sheet 1.

S. T. JOHNSON.
BICYCLE DRIVING GEAR.

No. 599,061. Patented Feb. 15, 1898.

Witnesses
C. F. Wappenhaus.
E. C. Albright

Inventor
Seward T Johnson
By his Attorney
Thompson R Hill

THE NORRIS PETERS CO., PHOTO-LITHO., WASHINGTON, D. C.

(No Model.) 2 Sheets—Sheet 2.

S. T. JOHNSON.
BICYCLE DRIVING GEAR.

No. 599,061. Patented Feb. 15, 1898.

Witnesses
C. F. Wappenhaus
E. C. Albright

Inventor
Seward T. Johnson
By his Attorney
Thompson & Ree

UNITED STATES PATENT OFFICE.

SEWARD T. JOHNSON, OF NOBLESVILLE, INDIANA.

BICYCLE DRIVING-GEAR.

SPECIFICATION forming part of Letters Patent No. 599,061, dated February 15, 1898.

Application filed March 23, 1895. Serial No. 542,913. (No model.) Patented in England July 1, 1895, No. 12,681; in France July 2, 1895, No. 248,605; in Belgium July 3, 1895, No. 116,444, and in Canada July 10, 1895, Nos. 49,455 and 49,456.

*To all whom it may concern:*

Be it known that I, SEWARD T. JOHNSON, a citizen of the United States, residing at Noblesville, in the county of Hamilton, and in the State of Indiana, have invented new and useful Improvements in Bicycle Driving-Gear, (for which patents in foreign countries were obtained as follows: Canada, July 10, 1895, Nos. 49,455 and 49,456; Great Britain, July 1, 1895, No. 12,681; France, July 2, 1895, No. 248,605, and Belgium, July 3, 1895, No. 116,444,) of which the following is a specification.

My invention relates to certain new and useful improvements in bicycle driving-gear; and it consists in a novel arrangement of driving mechanism, hereinafter more fully set forth.

The object of my invention is to provide means whereby the friction of the speed-reducing mechanism will be reduced to a minimum and also to reduce the mechanism into a more compact form for the purpose of not only decreasing the distance between the points of support of the axle, but also to bring the plane of action of the driven sprocket-wheel of the hub as close as possible to the plane of the center of the rim or tire of the wheel, thereby reducing the bending stress on the axle. I attain these objects by means of the construction of hub illustrated in the accompanying drawings, in which similar reference-numerals designate like parts throughout the several views.

Figure 1:
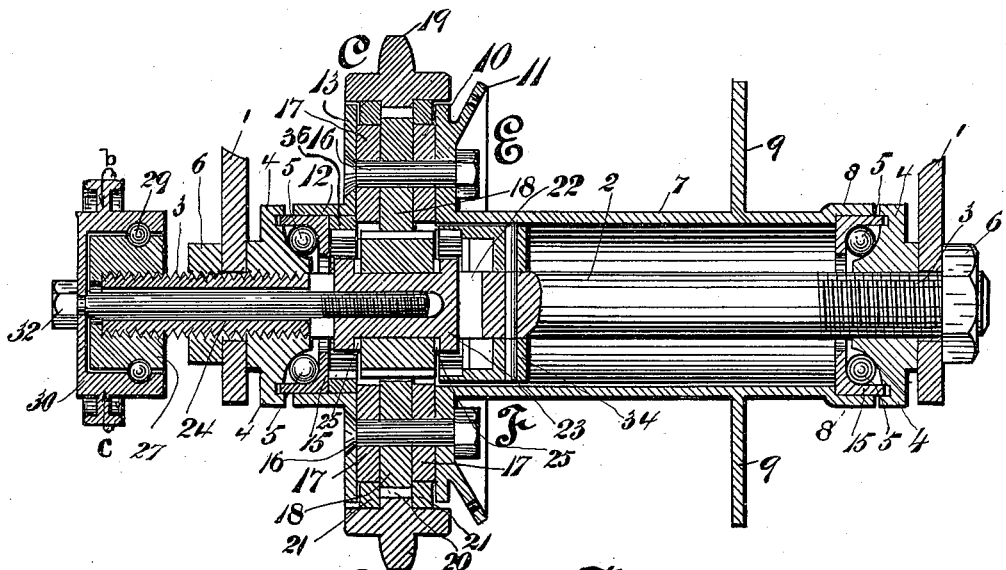
Figure 2:
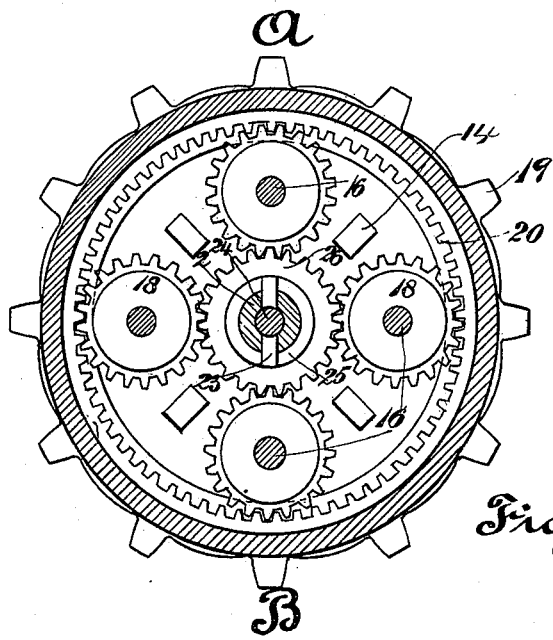
Figure 3:
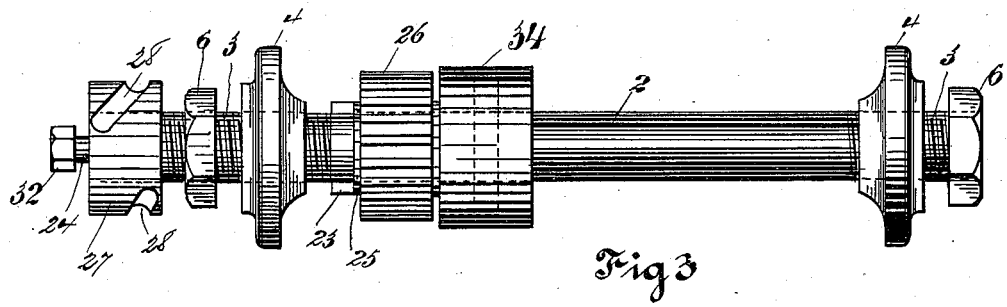
Figure 4:
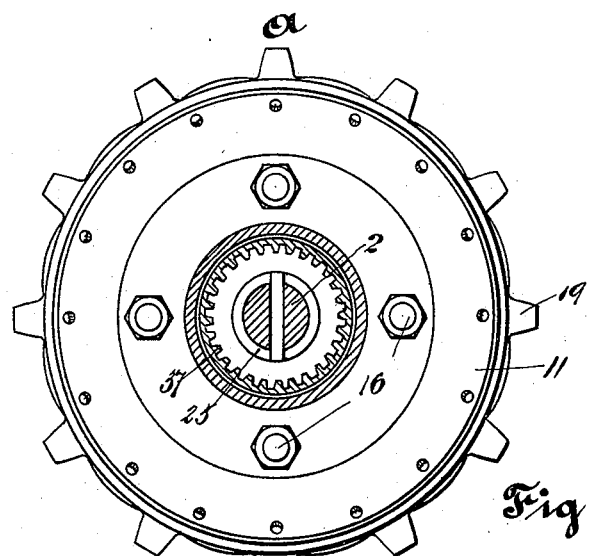
Figures 5, 6:
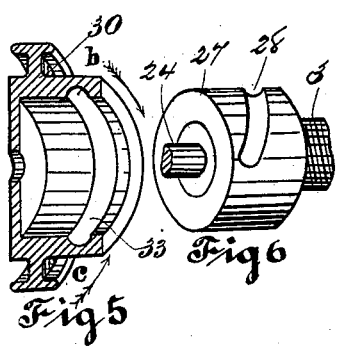
Figure 7:
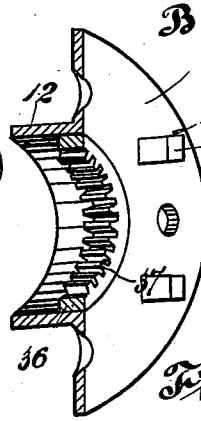
Figures 8, 9:
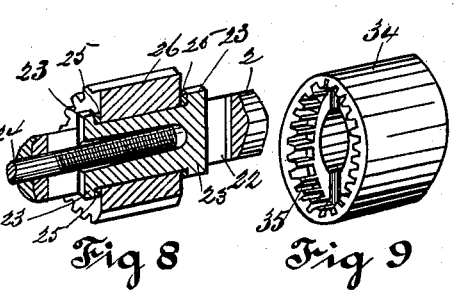

Figure 1 is a longitudinal sectional view of the hub, taken through the line A B. (See Figs. 2 and 4.) Fig. 2 is an end sectional elevation of the same, taken through the line C D. (See Fig. 1.) Fig. 3 is a detail view of the fixed axle. Fig. 4 is an end sectional view taken through the line E F. (See Fig. 1.) Fig. 5 is a sectional perspective detail view of the shifting-sleeve for moving said pinion on the axle longitudinally. Fig. 6 is a broken detail perspective view of the cam-collar of the shifting-sleeve. Fig. 7 is a detail view of the rotative clutch and the sleeve thereon. Fig. 8 is a detail perspective view of the gear-pinion clutch fixed on the axle. Fig. 9 is a detail perspective view of the gear-pinion on the fixed axle.

The fixed axle 2 of the hub has its ends 3 threaded to receive the races or ways 4 of the ball-bearings 5, and against the flat end surfaces of which the ends 1 of the fork of the bicycle-frame are clamped by the securing-nuts 6, which are also securely screwed on the ends 3 of said axle.

The hub of the wheel is composed of the hollow or tubular piece 7, having the enlarged end 8, the spoke-disk 9, and the disk 10, on the side of which is formed the inclined spoke-flange 11, all of which parts are formed in one integral piece. The opposite detachable end of the hub is composed of the sleeve 12 and the disk 13, on the face of which are formed the distance-pieces 14, which are adapted to bear or contact with the face of the opposing disk 10 for the purpose of maintaining said disks at their proper distance apart to permit the free working of the mechanism held between them.

The disk 9 is drilled near its peripheral edge with a series of holes, wherein the spokes of the wheel are secured in any suitable manner, and the flange 11 is also drilled in a similar manner and for the same purpose.

The enlarged end 8 of the hub and the sleeve 12 are adapted to receive the ball-bearing ways or races 15, wherein they are securely and firmly pressed, and between which races 15 and the races 4 on the fixed axle the ball-bearings 5 are adapted to roll or work. The disks 10 and 13 are of equal diameters and are drilled at equal radial distances from the center of the fixed axle, in which holes the journal-bolts 16 are secured by a suitable nut, by which they are caused to draw up or clamp said disk 10 against the ends of the distance-bars 14 to firmly hold the ends of the said hub together.

The bearing-rollers 17 are journaled on the journal-bolts 16, two to each journal, and between which the intermediate gear-pinions 18 are also journaled on the same journal-bolts.

The chain-driven sprocket-wheel 19 is formed with the internal gear-teeth 20, which mesh with all the intermediate gear-pinions 18. The opposite sides of the sprocket-wheel 19 are recessed and adapted to receive the rings 21, which are firmly pressed therein to form bearing rolling surfaces for the rollers 17, whereon they work and maintain the internal gear-wheel 20 concentric with the axis of the fixed axle, around which it rotates.

One end of the axle 2 is hollow or tubular, and toward the center of said axle, at the end of said hollow portion, is formed the key-slot 22, in which accurately fits and slides longitudinally the key 23. The gib-key 23 is slit centrally with a longitudinal slit, the edges of which are threaded and adapted to receive the tapered threaded end of the shifting-rod 24, by which said key is expanded outwardly to bind and firmly secure the keep-washers 25. The keep-washers 25 loosely fit on the axle 2, and the gear-pinion 26 is adapted to turn freely and to slide longitudinally on said axle and is held in position by said keep-washers. The keep-washers 25, with the gear-pinion 26 between them, are first placed on the axle 2, then the gibbed ends of the split key 23 are sprung or compressed together to permit said keeps and pinion to be passed over the end gibs of said key, and the shifting-rod 24 is now introduced into the threaded slot and screwed therein to tightly clamp the keep-washers 25 without clamping the gear-pinion 26, which latter is bored slightly larger in diameter than said keep-washers to permit its free rotation on the center of the key and the axle 2.

On the prolonged or projecting end of the axle 2 is firmly screwed the cam-collar 27, having the cam-grooves 28 formed on its peripheral surface, said grooves being two in number and arranged on the opposite peripheral sides of said collar and in which the ball-bearings 29 (one to each groove) freely and accurately work. The shifting thimble or sleeve 30 is loosely mounted on the reduced end or neck of the prolonged projecting end of the shifting-rod 24 and is held thereon by the retaining-nut 32, screwed on the threaded end of said rod, said sleeve having an annular groove 33 formed on its internal peripheral surface and adapted to receive the projecting portions of the ball-bearings 29 in the grooves of the cam-collar 27.

The fixed clutch 34 is formed with a recessed portion in which the gear-teeth 35 are formed and adapted to engage the gear-teeth of the pinion 26, and said clutch is firmly mounted on the axle 2 and secured thereon by a pin or other suitable securing device by which the clutch may be held from rotation. A similarly-recessed clutch 36, having internal gear-teeth 37 formed in the peripheral internal surface of said recess, is firmly secured in the sleeve 12, with its recessed internal geared end directed toward the central axle-pinion 26, and is also adapted to receive and engage said pinion. Both of the said clutches 34 and 36 are at suitable distances apart along the axle 2 to permit the pinion 26 to be placed in mid-position between them without being engaged by either, thereby permitting said pinion to be be moved longitudinally to be engaged alternately with either said clutches 34 and 36 and to be disengaged from both said clutches as required.

The manner of manipulating the mechanism to operate the wheel at a reduced speed ratio—that is, to increase the propelling or tractive force—also to disengage the speed-reducing gearing to permit the free rotation of the hub without rotating the chain-driven sprocket 19, and, finally, to engage or lock all the gearing to directly lock or connect the chain-driven sprocket 19 with the hub to turn therewith will now be explained.

To ride a bicycle up a steep hill with the least possible exertion the propelling force thereof is increased by moving the gear-pinion 26 longitudinally on its axle 2 by turning the sleeve 30 in the direction of the arrow $b$ till said pinion engages with the fixed clutch 34, in which position of said pinion the chain-driven sprocket rotates and drives the hub at a reduced speed through the medium of its reducing-gearing—that is, the internal gear 20, meshing with the intermediate gears 18, and these latter meshing with the pinion 26, hereinbefore described.

When it is required to permit the bicycle to run freely down an incline or hill with the least possible frictional resistance, the sleeve 30 is turned in the direction of the arrow $c$, to move the pinion 26 in mid-position between the fixed clutch 34 and the rotative clutch 36— that is, out of engagement with both said clutches—in which position of said pinion the hub is free to turn without rotating the chain-driven sprocket 19 or the chain or treadle-shaft by which it it driven. (Not shown in the drawings.)

When it is required to run the bicycle at its greatest velocity ratio, the clutch-sleeve is still farther moved in the direction of the arrow $c$ till the pinion 26 engages with the clutch-teeth of the clutch 36, in which position of the pinion the entire gearing and the hub are locked with the chain-driven sprocket-wheel and said hub turns with said sprocket, as if formed integral thereon.

Having thus fully described my invention, what I claim as new and useful, and desire to cover by Letters Patent of the United States therefor, is—

1. In a bicycle-wheel hub, the combination with a wheel-hub and a fixed shaft whereon said hub is mounted, said shaft having a hollow end portion and a slot formed at the end of said hollow portion, a gear-pinion mounted on said shaft, and adapted to turn and to slide longitudinally thereon, an internal gear mounted on said hub, intermediate gears carried by said hub and meshing with said internal gear and the gear-pinion on said shaft, a fixed clutch and a clutch adapted to turn with said hub, a gib-key in said slot and adapted to engage the ends of said pinion, a cam rigidly secured on the end of said shaft, a sleeve adapted to engage said cam and suitable means for connecting said sleeve to said shifting key, substantially as and for the purpose set forth.

2. In a bicycle-wheel hub, the combination with a wheel-hub and a fixed axle whereon said hub is mounted, said axle having a hollow or tubular end portion and a slot formed at the end of said hollow portion, of a gear-pinion adapted to turn and to slide longitudinally on said axle, an internal gear-wheel journaled on said hub, intermediate gears carried by said hub and meshing with said internal gear-wheel and said gear-pinion, a fixed clutch and a clutch adapted to turn with said hub, an expansible gib-key accurately fitting and adapted to slide longitudinally in said slot, keeps on said key, a cam on the prolonged end of said axle, a sleeve adapted to engage said cam, and suitable means for connecting said cam to said key and for expanding the latter, all substantially as and for the purpose set forth.

3. In a bicycle-wheel hub, the combination with a fixed axle supported at both ends and a wheel-hub mounted thereon, said axle having a hollow end portion and a slot adjoining the end of said hollow portion, a gear-pinion mounted on said axle and adapted to turn and to slide longitudinally thereon, an internal gear-wheel journaled on the end of said hub, intermediate gear-wheel carried by said hub and meshing with said internal gear-wheel and with said gear-pinion, a fixed clutch and a clutch adapted to turn with said hub, an expansible gib-key in said slot and adapted to slide longitudinally therein, a collar having peripheral cam-grooves, ball-bearings fitted in said grooves, a sleeve enveloping said collar and having an internal annular groove adapted to receive said ball-bearings, a rod connecting said shifting-sleeve and said sliding key, and means whereby said key may be expanded outwardly, all substantially as and for the purpose set forth.

In testimony whereof I have hereunto set my hand in the presence of two subscribing witnesses.

SEWARD T. JOHNSON.

Witnesses:
OSWALD JACKSON,
WM. BOOTH.